(12) United States Patent
Shani et al.

(10) Patent No.: US 10,989,863 B2
(45) Date of Patent: Apr. 27, 2021

(54) SLIM WAVEGUIDE COUPLING APPARATUS AND METHOD

(71) Applicants: Yosi Shani, Maccabim (IL); Tania Kosburd, Lod (IL); Dafna Bortman Arbiv, Zichron Yaacov (IL)

(72) Inventors: Yosi Shani, Maccabim (IL); Tania Kosburd, Lod (IL); Dafna Bortman Arbiv, Zichron Yaacov (IL)

(73) Assignee: OREE ADVANCED ILLUMINATION SOLUTIONS LTD., Rosh Haain (IL)

( * ) Notice: Subject to any disclaimer, the term of this patent is extended or adjusted under 35 U.S.C. 154(b) by 0 days.

(21) Appl. No.: 15/963,685

(22) Filed: Apr. 26, 2018

(65) Prior Publication Data

US 2020/0088929 A1 Mar. 19, 2020

Related U.S. Application Data

(63) Continuation of application No. 15/710,940, filed on Sep. 21, 2017, now Pat. No. 9,983,351, which is a continuation of application No. 15/432,490, filed on Feb. 14, 2017, now Pat. No. 9,798,077, which is a continuation of application No. 15/269,231, filed on Sep. 19, 2016, now Pat. No. 9,606,288, which is a continuation of application No. 14/849,933, filed on Sep. 10, 2015, now Pat. No. 9,470,837, which is a (Continued)

(51) Int. Cl.
*G02B 6/00* (2006.01)
*F21V 8/00* (2006.01)
*G02B 5/02* (2006.01)
*G02B 19/00* (2006.01)

(52) U.S. Cl.
CPC ............ *G02B 6/009* (2013.01); *G02B 5/021* (2013.01); *G02B 6/002* (2013.01); *G02B 6/0018* (2013.01); *G02B 6/0025* (2013.01); *G02B 6/0026* (2013.01); *G02B 6/0031* (2013.01); *G02B 6/0036* (2013.01); *G02B 6/0045* (2013.01); *G02B 6/0051* (2013.01); *G02B 6/0055* (2013.01); *G02B 6/0061* (2013.01); *G02B 6/0068* (2013.01); *G02B 19/0028* (2013.01); *G02B 19/0061* (2013.01); *G02B 19/0066* (2013.01); *G02B 6/0021* (2013.01); *G02B 6/0035* (2013.01); *G02B 6/0076* (2013.01)

(58) Field of Classification Search
CPC .. G02B 6/0031; G02B 6/0025; G02B 6/0026; G02B 19/0028; G02B 19/0061; G02B 19/0066
See application file for complete search history.

(56) References Cited

U.S. PATENT DOCUMENTS 7,316,495 B2 1/2008 Watanabe et al.
7,654,687 B2 2/2010 Tsai et al.
(Continued)

*Primary Examiner* — Anne M Hines
(74) *Attorney, Agent, or Firm* — Morgan, Lewis & Bockius LLP

(57) ABSTRACT

In various embodiments, an illumination structure includes a discrete light source disposed proximate a bottom surface of a waveguide and below a depression in a top surface thereof. A top mirror may be disposed above the discrete light source to convert modes of light emitted from the discrete light source into trapped modes, thereby increasing the coupling efficiency of the illumination structure.

20 Claims, 11 Drawing Sheets

Related U.S. Application Data continuation of application No. 14/478,444, filed on Sep. 5, 2014, now Pat. No. 9,164,218, which is a continuation of application No. 13/606,202, filed on Sep. 7, 2012, now Pat. No. 8,851,712, which is a continuation of application No. 12/715,880, filed on Mar. 2, 2010, now Pat. No. 8,297,786, which is a continuation-in-part of application No. 12/500,889, filed on Jul. 10, 2009, now Pat. No. 8,301,002.

(60) Provisional application No. 61/206,080, filed on Jan. 27, 2009, provisional application No. 61/079,582, filed on Jul. 10, 2008.

(56) References Cited

U.S. PATENT DOCUMENTS

| | | |
|---|---|---|
| 8,297,786 B2 | 10/2012 | Shani et al. |
| 8,301,002 B2 | 10/2012 | Shani |
| 8,851,712 B2 | 10/2014 | Shani et al. |
| 9,164,218 B2 | 10/2015 | Shani et al. |
| 9,470,837 B2 | 10/2016 | Shani et al. |
| 9,606,288 B2 | 3/2017 | Shani et al. |
| 2006/0262538 A1 | 11/2006 | Li et al. |
| 2008/0137335 A1* | 6/2008 | Tsai .................... G02B 5/0247 |
| | | 362/247 |
| 2010/0220484 A1 | 9/2010 | Shani et al. |
| 2017/0160456 A1 | 6/2017 | Shani et al. |

* cited by examiner

SLIM WAVEGUIDE COUPLING APPARATUS AND METHOD

CROSS-REFERENCE TO RELATED APPLICATIONS

This application is a continuation of U.S. patent application Ser. No. 15/710,940, filed on Sep. 21, 2017, which is a continuation of U.S. patent application Ser. No. 15/432,490, filed on Feb. 14, 2017, which is a continuation of U.S. patent application Ser. No. 15/269,231, filed on Sep. 19, 2016, which is a continuation of U.S. patent application Ser. No. 14/849,933, filed on Sep. 10, 2015, which is a continuation of U.S. patent application Ser. No. 14/478,444, filed on Sep. 5, 2014, which is a continuation of U.S. patent application Ser. No. 13/606,202, filed on Sep. 7, 2012, which is a continuation of U.S. patent application Ser. No. 12/715,880, filed on Mar. 2, 2010, which is a continuation-in-part of U.S. patent application Ser. No. 12/500,889, filed on Jul. 10, 2009, which claims priority to and the benefit of U.S. Provisional Patent Application Ser. No. 61/079,582, filed on Jul. 10, 2008, and U.S. Provisional Patent Application Ser. No. 61/206,080, filed on Jan. 27, 2009. Each of these applications is hereby incorporated herein by reference in its entirety.

TECHNICAL FIELD

Embodiments of the invention generally relate to illumination panels, and, more specifically, to coupling of light sources to waveguides.

BACKGROUND

Thin, planar illumination systems are desirable for many applications such as, for example, low-profile back-illuminated displays. FIG. 1 illustrates such an illumination system 100 fabricated by coupling a discrete light source, e.g., a light-emitting diode ("LED") 102 to a narrow face 104 of a waveguide 106. Generally, a waveguide 106 having a refractive index of N=1.5 and an LED 102 having Lambertian output characteristics, combined as in the illumination system 100, have a theoretical maximum coupling efficiency limit of 85%. That is, at most 85% of the light emitted by the LED 102 will be trapped within the waveguide 106, and the remaining portion of the emitted light will be lost.

This coupling inefficiency may be attributed to the constraints inherent in the side-emitting LED design of the illumination system 100. While thinner waveguides are desirable, the thickness t of the waveguide must be larger than the width d of the LED in order to achieve coupling efficiencies approaching 85%. Relatively high coupling efficiencies (e.g., greater than approximately 70%) are difficult to obtain for cases where the thickness t of the waveguide is smaller than the width d of the LED. Thus, as waveguides become thinner, the coupling efficiency of the waveguide decreases and more light is lost. The coupling inefficiency may even set a practical lower bound on the thickness of the waveguide 106. In addition, many side-emitting illumination systems utilize specially engineered LED and waveguide structures in order to increase the coupling efficiency. These structures not only add to the complexity and cost of the illumination system 100 but also increase its thickness.

Therefore, there is a need for systems and methods of coupling LEDs to waveguides in which high coupling efficiencies are obtained, while remaining easily and inexpensively manufacturable.

SUMMARY

The present invention enables superior coupling efficiencies between light sources such as LEDs and thin waveguides by utilizing an LED that is embedded inside a waveguide and emits all its light inside the waveguide. A first portion of the emitted light propagates through the waveguide because its emission angle (with respect to the waveguide's upper surface) results in total internal reflection ("TIR") of the first portion. A second portion of the light is not emitted at an angle to the waveguide's upper (and/or lower) surface resulting in total internal reflection; this second portion may be reflected by a specular mirror positioned above the LED. The light thus reflected also undergoes total internal reflection, improving the coupling efficiency to the waveguide. Embodiments of the invention enable the waveguide to have a small thickness, e.g., less than approximately 1 mm, with an LED having a width of approximately 1 mm. Moreover, embodiments of the invention also utilize standard waveguide shapes and standard LED light sources not engineered to re-reflect emitted light, thereby reducing the cost and complexity of the system. Finally, embodiments of the invention do not require specially designed reflectors or selectively coated waveguide surfaces, further decreasing manufacturing cost and complexity.

Advantages of the invention include the ability to use top-emitting (e.g., Lambertian) LEDs instead of side-emitting LEDs, which enables the use of inexpensive and high-power top-emitting bare-die LED chips that can emit light in all directions. Such chips may be placed below the waveguide instead of attached to a narrow side of the waveguide. A mirror may be used that exhibits specular reflection instead of a mirror exhibiting total internal reflection or a diffuser (i.e., a surface exhibiting diffuse reflection). The mirror may be positioned and designed such that most of the light emitted from the LED, e.g., more than approximately 85%, is coupled to the waveguide. Moreover, the light reflected by the mirror may be within the propagation angle of the waveguide after reflection. Back-reflection of light toward the LED may be prevented, thereby obviating the need for specially engineered increased reflectivity of the LED surface (or the surface of the LED electrode) to decrease light absorption by the LED.

The waveguide and LED may be included in a full illumination device featuring in-coupling, concentration, propagation, and out-coupling regions. Light propagating inside the waveguide in a direction away from the out-coupling region may be redirected toward the out-coupling region by a specially engineered shape of the waveguide's back edge. A top mirror may be included to reduce or prevent reflection of light back toward the LED in the vertical direction; a concentrating mirror may also be included (on, e.g., the back surface of the waveguide) to reduce or prevent reflection of light back toward the LED in the horizontal direction.

The full illumination device may provide efficient (e.g., greater than approximately 70% or even 85% or more) light in-coupling to a thin waveguide, even when the thickness of the waveguide is approximately equal to (or even less than) the LED width.

In an aspect, embodiments of the invention feature an illumination structure including or consisting essentially of a waveguide, a discrete light source, and a top mirror. The waveguide has a depression in its top surface, the discrete light source is disposed proximate the bottom surface of the waveguide and below the depression, and the top mirror is disposed above the discrete light source.

The top mirror may include or consist essentially of a conical mirror disposed over and at lest substantially filling the depression. An air gap may be disposed between the conical mirror and the depression. The top mirror may include or consist essentially of a substantially flat mirror disposed over substantially all of the depression. The substantially flat mirror may be a specular mirror, a diffusive reflector, a Fresnel reflector, and/or a diffractive optical element. At least a portion of light emitted from the discrete light source may be reflected from a side surface of the waveguide through the depression in a confined mode of the waveguide. At least a portion of light emitted from the discrete light source may be reflected from a side surface of the waveguide through the depression and reflected back into the waveguide in a confined mode of the waveguide by the substantially flat mirror.

In another aspect, embodiments of the invention feature an illumination structure including or consisting essentially of a waveguide having a cavity through a thickness thereof, a discrete light source disposed in the cavity, and a top mirror disposed in the cavity above the discrete light source. The top mirror may include or consist essentially of a conical mirror and/or a substantially flat mirror. The portion of the cavity not occupied by the top mirror and the dicrete light source may be filled with an index-matching material. The index-matching material may have an index of refraction substantially matching that of the waveguide. The cross-sectional area of the cavity proximate the top mirror may be larger than the cross-sectional area of the cavity proximate the discrete light source.

In yet another aspect, embodiments of the invention feature a method for coupling light emitted from a discrete light source to a waveguide. Light is emitted from a discrete light source disposed within a waveguide. A portion of the emitted light is reflected from a top mirror disposed above a depression in the top surface of the waveguide (the depression being disposed above the discrete light source), so as to confine the reflected portion of the emitted light within the waveguide.

The top mirror may include or consist essentially of a conical mirror substantially filling the depression, and the portion of the emitted light may traverse an air gap between the depression and the top mirror before being reflected. A second portion of the emitted light may be reflected from a side surface of the waveguide through the depression so as to confine the reflected second portion of the emitted light within the waveguide. The reflected second portion of the emitted light may not strike the top mirror after being reflected through the depression. The reflected second portion of the emitted light may strike the top mirror after being reflected through the depression, and the reflection from the top mirror may confine the reflected second portion of the emitted light within the waveguide.

In a further aspect, embodiments of the invention feature a method for coupling light emitted from a discrete light source to a waveguide. Light is emitted from a discrete light source disposed within a cavity extending through the thickness of a waveguide. A portion of the emitted light is reflected from a top mirror disposed above at least a portion of the cavity so as to confine the reflected portion of the emitted light within the waveguide. The top mirror may include or consist essentially of a conical mirror and/or a substantially flat mirror. The portion of the cavity not occupied by the top mirror and the discrete light source may be filled with an index-matching material. The index-matching material may have an index of refraction substantially matching that of the waveguide.

In another aspect, embodiments of the invention feature a method of forming an illumination structure. A substantially planar waveguide having input and output regions is formed. A depression in the top surface of the waveguide in the input region and a notch in the bottom surface of the waveguide in the input region are formed. A top mirror is disposed over the depression, and a discrete light source is disposed within the notch. The top mirror may include or consist essentially of a conical mirror, and disposing the top mirror over the depression may include substantially filling the depression with the top mirror. An air gap may be left between the top mirror and the depression. The top mirror may include or consist essentially of a substantially flat mirror, and disposing the top mirror over the depression may include substantially covering the depression with the top mirror. At least a portion of the notch may be filled with an index-matching material. The index-matching material may have an index of refraction substantially matching that of the waveguide.

These and other objects, along with advantages and features of the present invention herein disclosed, will become more apparent through reference to the following description, the accompanying drawings, and the claims. Furthermore, it is to be understood that the features of the various embodiments described herein are not mutually exclusive and may exist in various combinations and permutations.

BRIEF DESCRIPTION OF THE DRAWINGS

In the drawings, like reference characters generally refer to the same parts throughout the different views. In the following description, various embodiments of the present invention are described with reference to the following drawings, in which.

DETAILED DESCRIPTION

Described herein are methods and systems for coupling light from a light source to a waveguide. Embodiments of the invention apply to two different cases: (1) when a thickness, t, of the waveguide is approximately equal to or larger than the width, d, of the light source and (2) when t is less than d. In cases where t is approximately equal to or larger than d, a curved, semi-curved, broken-line, or single-line top mirror redirects light that strikes it into confined modes (i.e., propagation paths confined by the waveguide). As utilized herein, with reference to the two-dimensional cross-sectional view of the mirror element, "curved" refers to a mirror with a curved shape, "semi-curved" refers to a mirror with a curved segment and straight segments, "broken-line" refers to a mirror having several discrete straight segments that approximate a curved segment, and "single-line" refers to a mirror consisting of a straight segment. The mirror is positioned such that light propagating at an angle less than necessary for TIR (and which therefore will not be confined within the waveguide) strikes the mirror. Thus, the mirror shape and position may enable the redirection of light from unconfined modes into confined modes. Any light already in a confined mode that does strike the mirror may remain in a confined mode after reflection.

Figure 1:
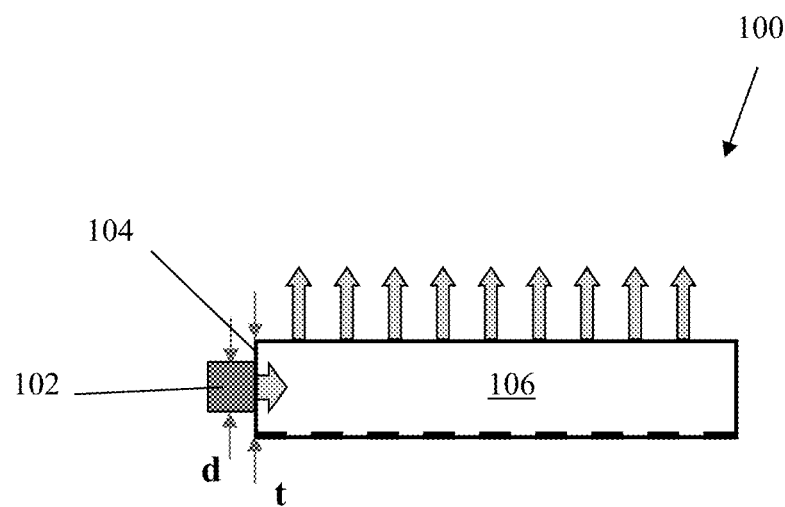
FIG. 1 is a cross-sectional view of a prior-art side-mounted illumination system.
Figure 2:
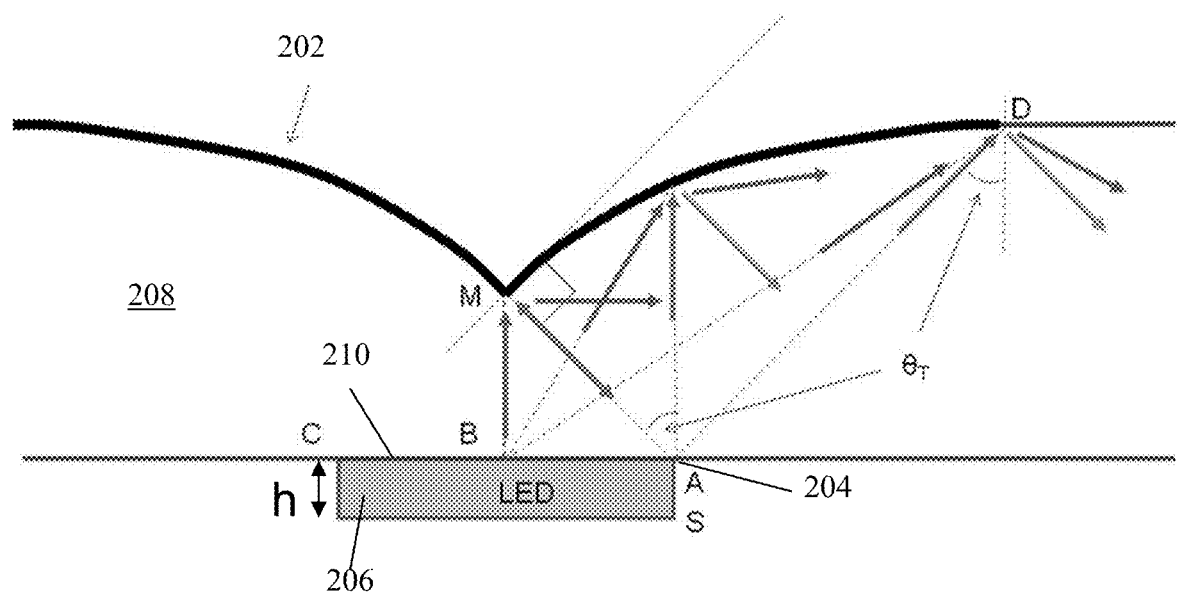
FIG. 2 is a cross-sectional view of an illumination system featuring a parabolic mirror.

FIG. 2 illustrates one example of a parabolic mirror 202 that is set around a point A (the top-right corner 204 of an LED 206), such that the light rays emitted from the point A toward the region of the mirror bounded by points M and D ("region M-D") are reflected back into the waveguide 208 at an angle equal to (or larger than) the critical angle $\theta_T$ for total internal reflection. Thus, all of the light rays from the portion of the top surface 210 of the LED 206 bounded by points A and B ("region A-B") may be reflected at angles larger than $\theta_T$ so as to be confined. The light rays from the region bounded by points B and C ("region B-C") may undergo one or multiple reflections at the mirror such that their final propagating angle is also greater than $\theta_T$.

Light rays that do not strike the mirror are, by definition, already confined (i.e., propagating at an angle greater than $\theta_T$) because the light ray from point A to point M and the light ray from point A to point D propagate at an angle $\theta_T$. The light ray from point A to point M propagates perpendicularly to the surface of the mirror 202 at point M such that the light is reflected back toward point A. At point D, the mirror 202 is substantially parallel to the plane of the waveguide 208, and the light ray propagating from point A at an angle $\theta_T$ is reflected into the waveguide 208 at an angle $\theta_T$ (pursuant to Snell's Law). The light rays may act similarly if one or more cladding layers (not shown) are added to the waveguide 208.

Figure 3:
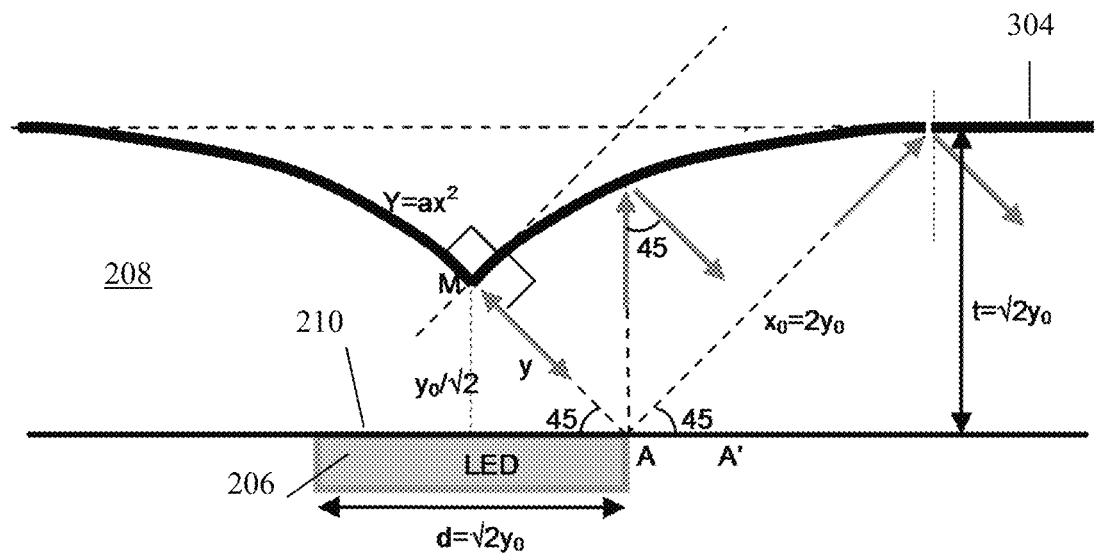
FIG. 3 is a cross-sectional view of an illumination system showing relative dimensions.

FIG. 3 depicts an exemplary embodiment of the invention that includes relative dimensions. As shown in FIG. 3, the waveguide 208 thickness t (as measured from the top surface 210 of the LED 206 to the top surface 302 of the waveguide 208) may be approximately equal to the LED 206 width d.

In further embodiments, the mirror configuration takes alignment tolerances into account. With reference to FIG. 3, the mirror 304 may be a parabolic mirror defined by the equation $y=ax^2$, where point M defines the origin point (i.e., x=0 and y=0), point A lies on the y-axis, and $a=\frac{1}{4}y_0$. The width d of the LED 206 and the thickness t of the waveguide 208 may thus be defined as $\sqrt{2}y_0$, and the shortest distance between the mirror 304 and the surface 210 (at point M of the mirror 304) is $y_0/\sqrt{2}$. Because point M of the mirror 304 is defined with reference to point A (the right edge of the LED 206), slight misalignment of the LED 206 may lead to less efficient light coupling. The sensitivity to such misalignment may be reduced by positioning point M with respect to a point A' offset from point A by a typical misalignment tolerance, e.g., approximately 0.1 mm.

Figure 4:
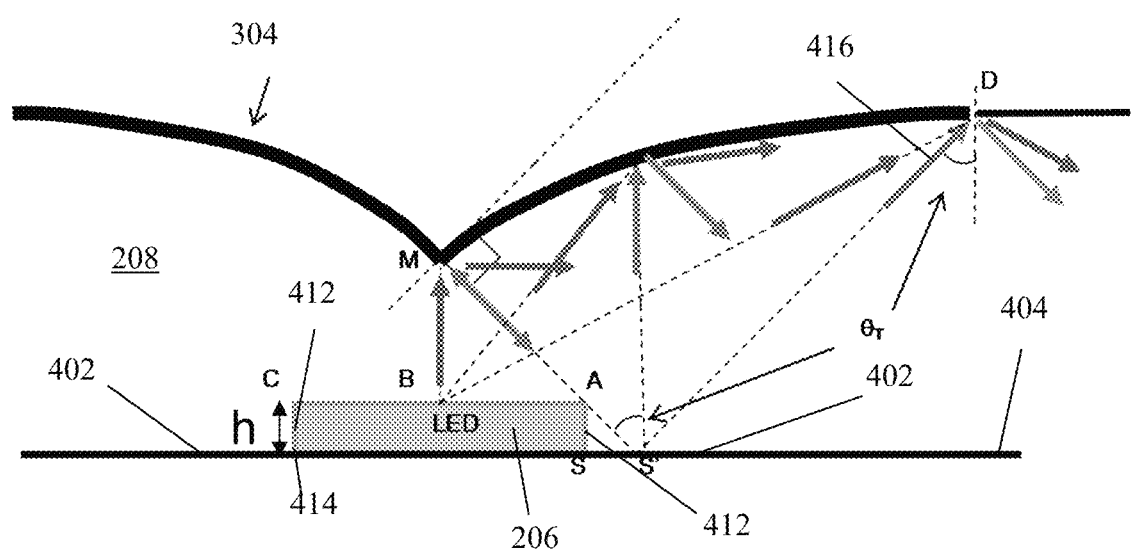
FIG. 4 is a cross-sectional view of an illumination system with an embedded LED.

Referring to FIG. 4, in various embodiments, light emitted by or through side faces 412 of the LED 206 may be coupled into the waveguide 208. In such cases, the LED 206 may be embedded within the waveguide 208, as shown, which then may have a thickness of approximately t+h (i.e., slightly larger than the LED width d). In this configuration, the light from an LED 206 having a width d of approximately 1 mm may be coupled to a waveguide 208 having a thickness of approximately 1 mm (or slightly greater than approximately 1 mm) while achieving a coupling efficiency greater than approximately 85%, or even greater than approximately 95%.

Light emitted from a side surface 412 of the LED 206 (assuming the LED 206 is capable of emitting such light) may propagate at angles less than the angle required for total internal reflection. A reflecting layer 402 may therefore be placed at the bottom facet 404 of the waveguide 208, at least spanning and desirably extending beyond the perimeter of the LED 206, to capture the unconfined light. The reflecting layer 402 may reflect unconfined light toward the top mirror 304. In that case, the position of point D may be determined by the ray 416 from point S' that strikes the waveguide 208 top surface at an incident angle equal to the critical angle $\theta_T$. The distance between points S and S' may be approximately equal to the thickness h of the LED 206.

In accordance with embodiments of the invention, the non-zero thickness h of the LED 206 is considered when designing the shape and placement of the mirror 202. This consideration is important for LEDs that not only emit light from their top surfaces 210 (as in the case described above), but also from their side surfaces 412. The light emitted from or through the side surfaces 412 of the LED 206 may also be confined in the waveguide 208. Referring to FIG. 2, the critical angle $\theta_T$ is determined by the ray from point S (the bottom-right corner 414 of the LED 206) to point D. Thus, $\theta_T$ will be slightly larger than the $\theta_T$ described above (which may apply to an LED that emits light only from its top surface). This selection of the proper $\theta_T$ enables the coupling of substantially all light emitted from the LED 206.

For example, the critical angle for total internal reflection for a waveguide, cladded by air ($N_{clad}=1$), with a refractive index of N=1.5 is approximately 42 degrees. However, for an LED 206 having a thickness h of approximately 0.1 mm and a waveguide 208 having a thickness t of approximately 1 mm, the critical angle $\theta_T$ (measured from point A) is approximately 45 degrees. In general, the critical angle $\theta_T$ for TIR for a waveguide clad in a material having an index of refraction $N_{clad}$ (such as, for example, a waveguide core surrounded by cladding layers) is given by $\theta_T = \sin^{-1}(N_{clad}/N)$.

Figure 5:
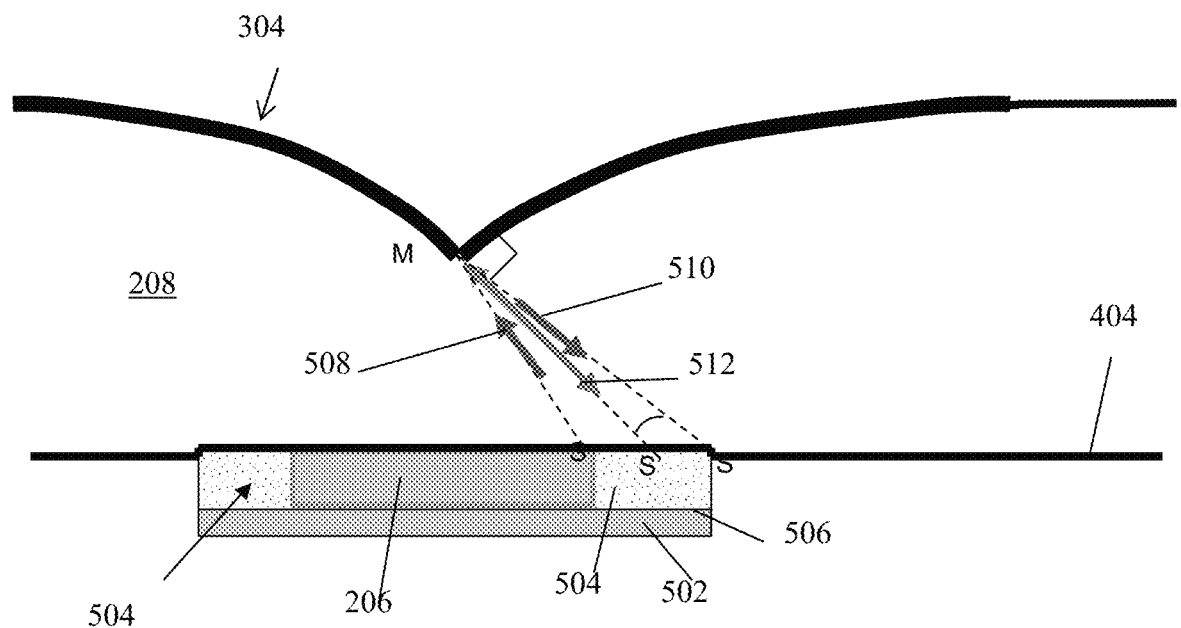
FIG. 5 is a cross-sectional view of an illumination system featuring an LED sub-assembly.

FIG. 5 illustrates an LED light source 206 assembled on a top surface of an LED sub-assembly module 502, such as a printed-circuit board ("PCB") or a carrier plate, which provides a mechanical interface to hold the LED light source 206 in position and/or an electrical interface to operate the LED light source 206. In these assemblies, an index-matching material 504 may be used to fill the space between the LED 206 and the top mirror 304 (and/or bottom facet 404), thereby providing an optical connection not only between the LED 206 and the top mirror 304 (and/or bottom facet 404) but also between the top mirror 304 (and/or bottom facet 404) and the top surface 506 of the LED sub-assembly 502.

The top surface 506 of the LED sub-assembly 502 may extend beyond the dimensions of the LED light source 206, thus allowing guided light rays to reach the top surface 506 of the LED sub-assembly 502. The reflectivity quality of the LED sub-assembly surface 506 may not be controllable and is less than the TIR reflectivity. Therefore, the top mirror 304 positioned over the LED light source 206 is preferably designed to reflect light away from the LED sub-assembly 502. In one embodiment, as shown in FIG. 5, the top mirror 304 has a parabolic contour.

Referring again to FIG. 5, a light ray 508 is coupled from a point S at the right edge 510 of the LED light source 206, reflected from a point M on the top mirror 304, and radiates back along a path 510 to a point S" at the end of the index-matching region 504 of the LED sub-assembly 502. Other rays emitted from the LED light source may be reflected past the LED sub-assembly 502 to the region beyond point S". Point S', which is approximately halfway between points S and S", may be used as a reference point for forming the parabolic shape of the top mirror 504. For example, a light ray 512 emitted from point S' that strikes the top mirror at point M may be reflected back toward point S'. The shape of the top mirror 304 at point M may a sharp edge or a curve. For example, if the width of the top mirror 304 is 2 mm, the shape of the top mirror 304 at point M may be a curve having a radius of 0.1 mm. Such a shape may decrease the manufacturing cost and/or complexity of the top mirror 304 relative to the cost and complexity of manufacturing a sharp edge at point M without significantly affecting the performance of the top mirror 304.

In alternative embodiments where t is less than d, in general, all the unconfined light rays (propagating at angles below the critical angle) strike a curved, semi-curved, or broken-line top mirror that redirects the light back into the waveguide. The mirror preferably does not reflect the light back into the LED. While most of these reflected rays are redirected to confined modes (i.e., propagation paths confined by the waveguide), some remain propagating at angles below the critical angle (i.e., they remain unconfined modes). These unconfined modes may be redirected toward a bottom diffusive reflector which redirects at least a significant portion (for example, greater than 55%) of this remaining light into confined modes.

Figure 6:
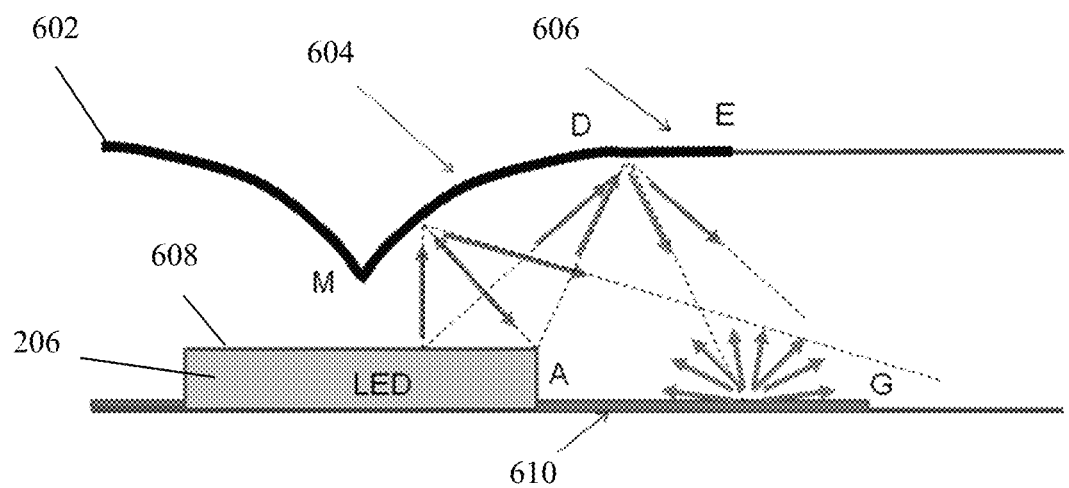
FIG. 6 is a cross-sectional view of an illumination system featuring a bottom diffusive mirror.

FIG. 6 depicts a top specular mirror 602 including a curved section 604 between points M and D and a flat section 606 between points D and E. The flat section 606 may be substantially parallel to a top surface 608 of the LED 206. A bottom diffusive mirror 610 extends from approximately the LED 206 edge A to a point G and may be designed so that most or all of the reflected light already corresponding to confined modes does not strike the bottom diffusive mirror 610. A similar bottom diffusive mirror may be disposed on the other side of the LED 206. Light emitted from the LED 206 that does not strike the curved section 604 may instead strike the flat section 606 and be reflected toward the bottom diffusive mirror 610. This light, initially in an unconfined mode, strikes the diffusive mirror 610 and is reflected into confined modes. Coupling efficiencies greater than approximately 80% may be obtained with this configuration.

Figure 7:
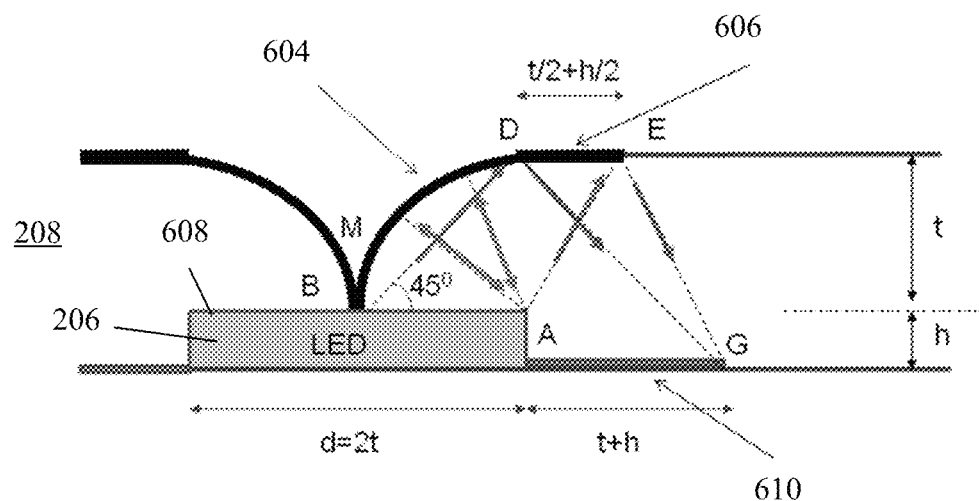
FIG. 7 is a cross-sectional view of an illumination system featuring an alternative mirror design.

FIG. 7 depicts an embodiment in which the curved section 604 of the mirror 602 has a radius approximately equal to half the width of the LED 206 (i.e., d/2), and point M of the mirror approximately coincides with point B (the center of the top surface 608 of the LED 206). The waveguide 208 thickness is approximately equal to t+h, where t=d/2 and h is the LED thickness. Light rays from point A that propagate toward the curved section 604 are reflected back toward point A. Light rays from point B propagating at approximately 45 degrees strike the top mirror 602 at point D and are reflected to point G of the diffusive mirror 610. Thus, most or all of the unconfined modes emitted from the LED 206 between points A and B strike the diffusive mirror 610 and are reflected into confined modes.

In one embodiment, large illumination structures are formed by arranging (or "tiling") panels that include the above-described waveguide structures. In a tiled structure, each panel may include or consist essentially of an input region and an output region, and the output region of one panel may cover the input region of an adjoining panel. Thus, only output regions may be observable from above the tiled structure. In an alternate embodiment, a large illumination structure is formed by placing panels adjoining each other (i.e., in a non-tiled configuration with no overlap between panels) such that light is coupled out from the entire panel surface.

Figure 8:
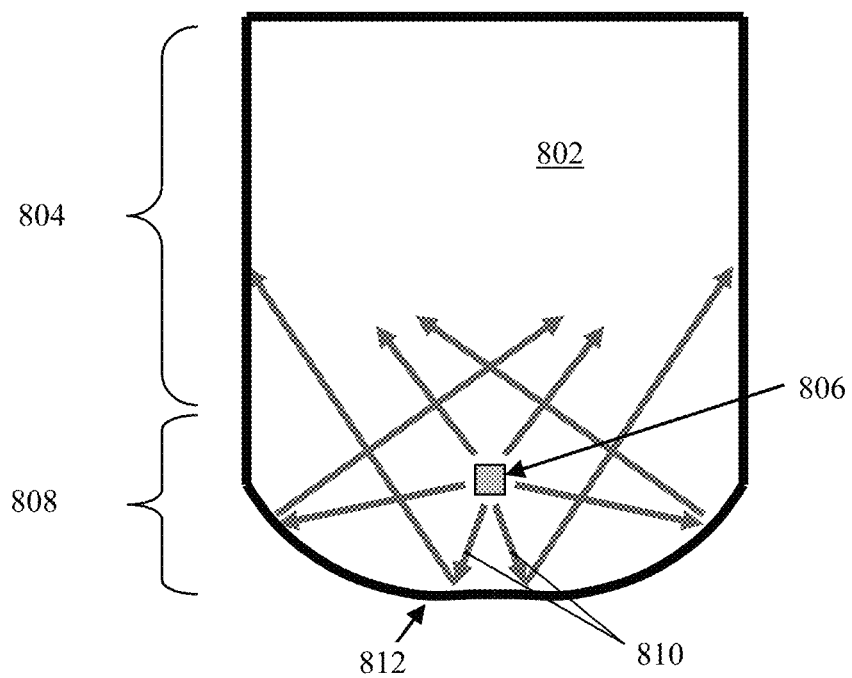
FIG. 8 is a plan view of an illumination panel for use in a tiled configuration of panels.

FIG. 8 illustrates a panel 802 for use in a tiled configuration of one or more panels. The output region 804 of each panel 802 may include scattering structures (such as hemispheres, wedges, particles, and/or other similar structures). Light from an LED 806 disposed in an input region 808 is preferably directed toward the output region 804 such that the light does not pass through the LED 806 and/or a top mirror. Light rays 810 emitted by the LED 806 away from the output region 804 may be reflected back toward the output region 804 by a back horizontal mirror 812. In a preferred embodiment, the back horizontal mirror 812 is not perfectly linear, but rather includes or consists essentially of one or two elliptical mirror sections.

Figure 9:
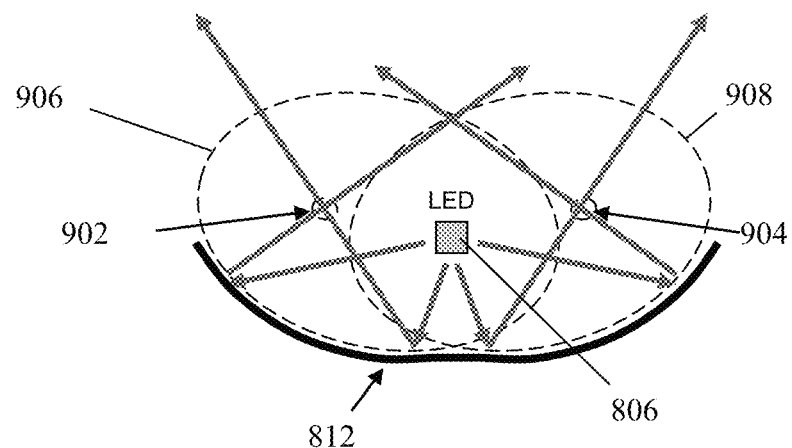
FIG. 9 is a plan view of an in-coupling region featuring elliptical mirror sections.

FIG. 9 shows, in one embodiment, elliptical mirror sections 906, 908 each define a portion of the back horizontal mirror 812. The LED 806 may be positioned approximately at a position corresponding to the poles common to each ellipse 906, 906 (which also have poles 902, 904). Thus, substantially all of the light rays emitted from the LED 806 may be redirected (and distributed) to the output coupling region 804 while not passing through the LED 806.

In some embodiments, emission of white light (e.g., formed by the combination of red, green, and blue ("RGB") light) or light corresponding to combinations of red, green, and blue light is desirable. In such embodiments, each single LED of the above-described embodiments may be replaced by a set of at least three LEDs: at least one emitting red light, at least one emitting green light, and at least one emitting blue light.

Figure 10:
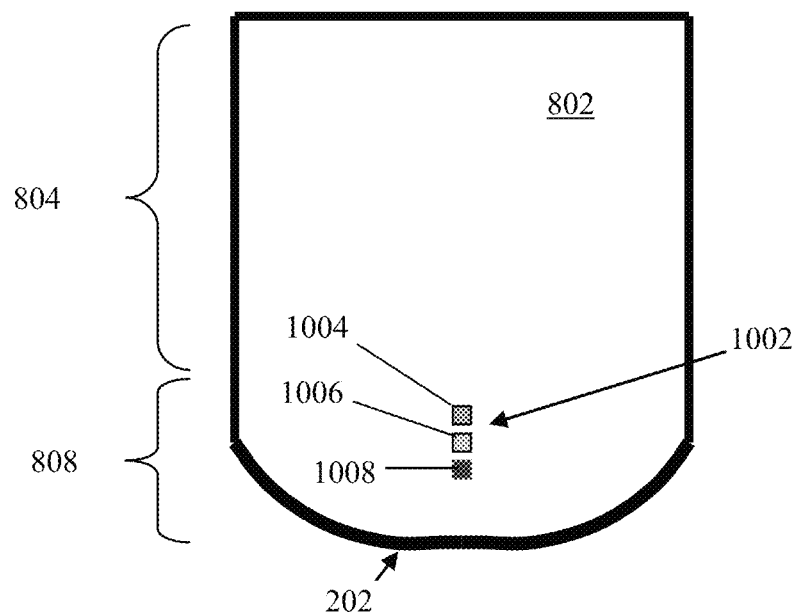
FIG. 10 is a plan view of an illumination panel featuring multiple LEDs.
Figure 11:
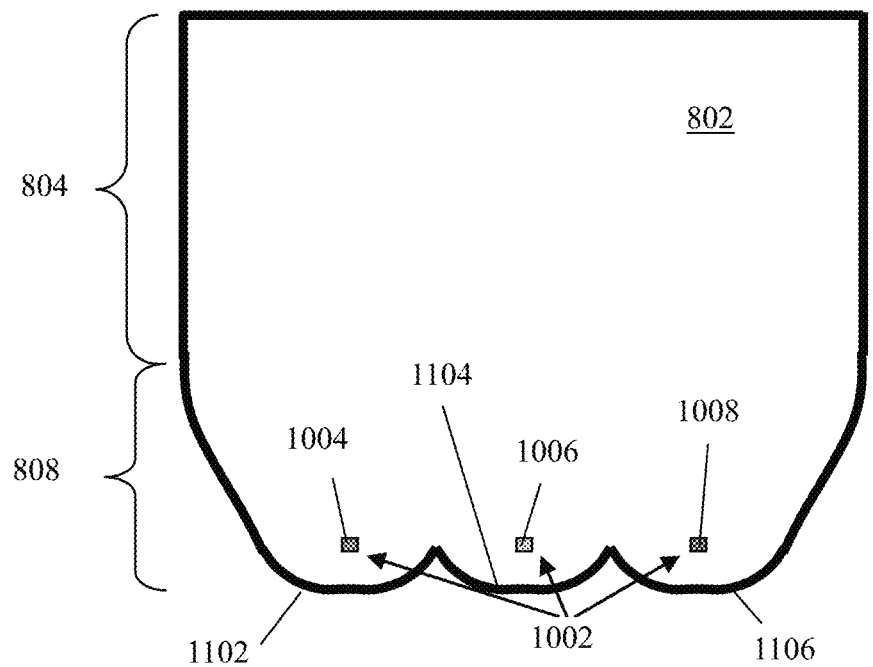
FIG. 11 is a plan view of an illumination panel featuring multiple LEDs in an alternate configuration.

FIG. 10 illustrates an embodiment in which a plurality of LEDs 1002 are "crowded" (i.e., arranged close together, but not necessarily collinearly), such that color mixing is optimized and the loss due to light propagating from one LED directly to the other LEDs is minimal. The LEDs may include a red LED 1004, a green LED 1006, and a blue LED 1008. In another embodiment, shown in FIG. 11, separate horizontal back mirrors 1102, 1104, 1106 are provided for each LED 1004, 1006, 1008, respectively, and the colors are mixed to white light while propagating in the input region (i.e., before the light reaches the output region 804).

Figure 12:
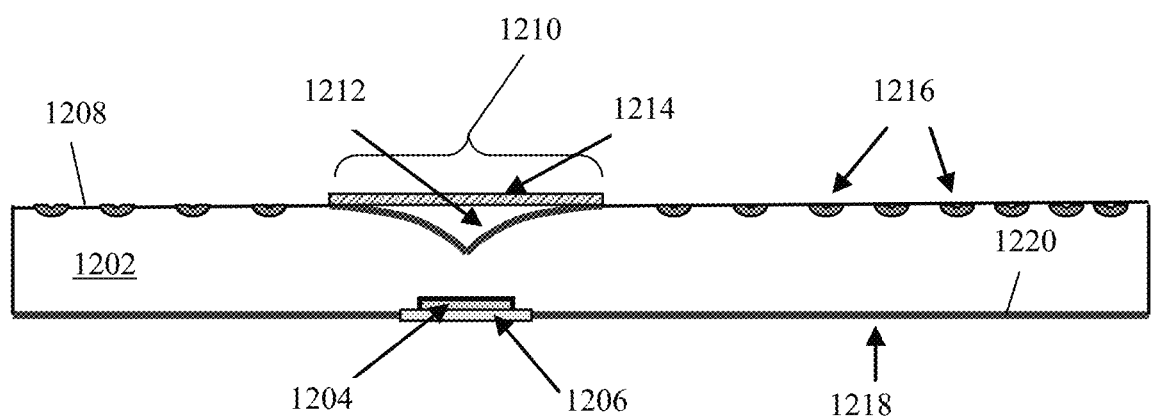
FIG. 12 is a cross-sectional view of an illumination panel.

FIG. 12 illustrates a side view of a panel 1202 including an LED 1204 disposed on a substrate 1206. In an "isolated" or "non-tiled" panel configuration, light is preferably emitted from the entire top surface 1208 of the panel 1202, including the region 1210 above the top curved mirror 1212. In one embodiment, the intensity of the light emitted through the top curved mirror 1212 is equal to the intensity of the light coupled out from the rest of the top surface 1208 of the panel 1202. A suitable absorber 1214 may be placed above the top curved mirror 1212 to emit light of a desired intensity therefrom.

Some light may penetrate through the top curved mirror 1212. For example, suppose the LED 1204 has a width of 0.5 mm, the area of the top curved mirror 1212 is $1.5^2=2.25$ mm$^2$ (in accordance with the mirror 304 of FIG. 3, above). Assuming a panel 1202 of width 10 cm and depth 10 cm, 100% output coupling efficiency, and a mirror transparency of 1%, in order to obtain the same intensity across the entire panel, the absorber 1214 should absorb ~98% of the light intensity.

In one embodiment, the absorber 1214 is diffusive. In another embodiment, scattering structures 1216 may be placed across some or all of a top surface 1208 of the panel 1202 to aid in the out-coupling of light. A mirror 1218 may placed at the bottom surface 1220 of the panel 1202.

Figure 13:
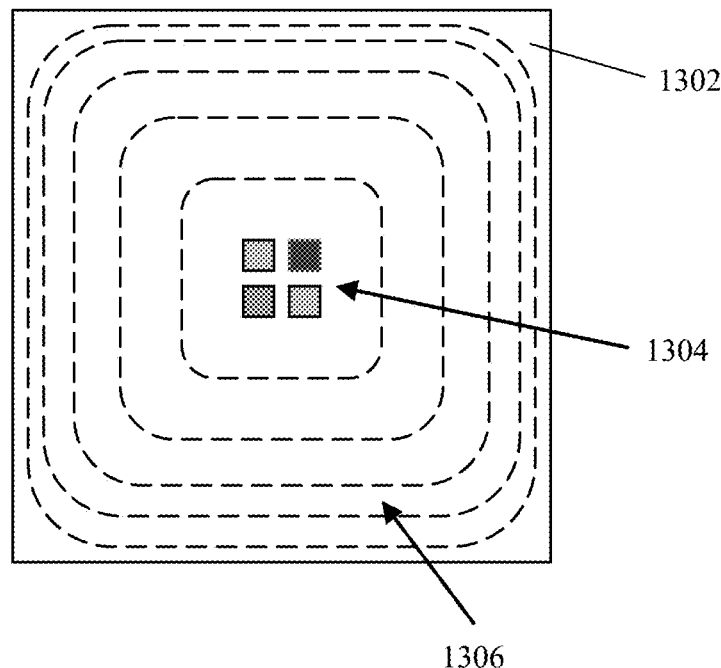
FIG. 13 is a plan view of an illumination panel featuring scattering structures.
Figure 14:
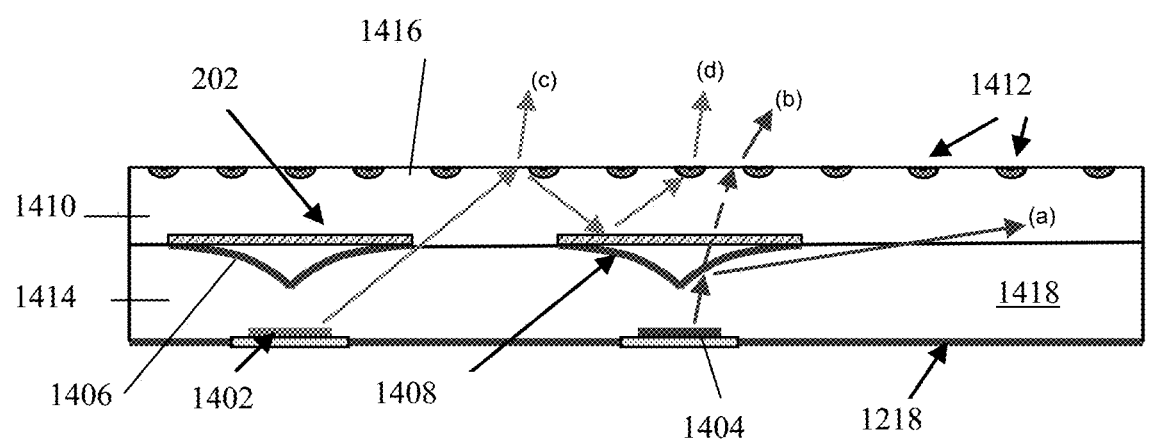
FIG. 14 is a cross-sectional view of an illumination panel featuring two layers.

Several conditions may aid the incorporation of RGB LEDs into an isolated panel configuration. First, the LEDs may be crowded (i.e., positioned closely together) to permit the use of a single out-coupling structure for all of the LEDs. In order to maintain a substantially uniform light level emitted across the panel, the density of scattering structures preferably increases as a function of distance away from the LEDs. Alternatively, scattering structures with increasing scattering coefficients (as a function of distance away from the LEDs) may be utilized. Preferably, the region above the top curved mirror of one LED may be transparent to light emitted by the other LEDs in order to facilitate out-coupling of light of all colors. FIGS. 13 and 14 depict a suitable configuration.

FIG. 13 depicts a top view of an isolated illumination panel 1302 that includes four crowded LEDs 1304 (e.g., one red, two green, and one blue—"RGGB"). Out-coupling scattering structures 1306 are provided between and/or around the LEDs 1304. A cross-sectional view of two of the LEDs 1304, including a red LED 1402 and a blue LED 1404, and their corresponding upper curved mirrors 1406, 1408 is shown in FIG. 14. A top layer 1410 of the waveguide disposed above the upper curved mirrors 1406, 1408 includes scattering structures 1412 for facilitating the out-coupling of light in the regions above the upper curved mirrors 1406, 1408. The top layer 1410 is preferably optically connected with the bottom layer 1414 (the layer containing the curved mirrors 1406, 1408 and the LEDs 1402, 1404) such that light freely propagates from one layer to the other. The scattering structures 1412 may be disposed at the top surface 1416 of the top layer 1410. In other embodiments, the scattering structures 1412 are incorporated in other portions of the top layer 1410, or even in the bottom layer 1414.

FIG. 14 also depicts several different light rays, each traveling a different path from an LED 1402, 1404 to emission from the waveguide 1418. Ray (a) is emitted from the blue LED 1404 and scattered from the blue top curved mirror 1408 into the waveguide 1418. Ray (b) is the part of ray (a) that penetrates through the mirror 1408 and is emitted from the waveguide 1418 by the scattering structures 1412. Ray (c) is emitted from the red LED 1402 and then from the waveguide 1418 through the scattering structures 1412. Ray (d) is the part of ray (c) that is reflected back to the waveguide 1418 and, after reflection therefrom, is emitted from the waveguide 1418 in the region above the blue top curved mirror 1408.

Figure 15A:
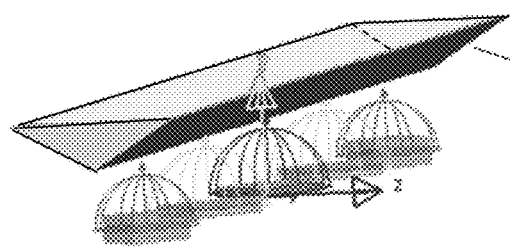
FIGS. 15A and 15B are a perspective view and a plan view, respectively, of an illumination panel featuring multiple LEDs.
Figure 15B:
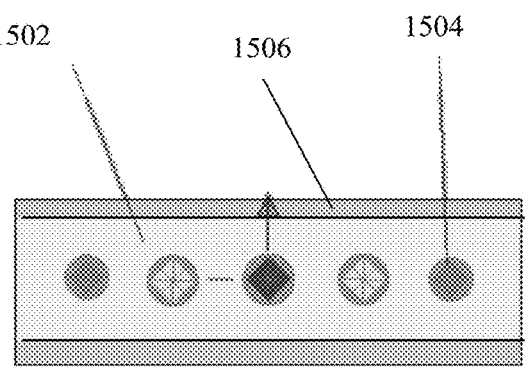

In some embodiments featuring multiple LEDs, such as the RGB LEDs described above, each LED has its own, separate top mirror. In these embodiments, each top mirror is shaped like a cone, pyramid, or any other non-flat shape suitable to retaining light within the waveguide that would otherwise escape. In other embodiments, more than one of the LEDs share a single top mirror. The LEDs may be arranged in a line, and the shared top mirror may be shaped like a prism with curved side facets. In one embodiment, as illustrated by FIGS. 15A and 15B, the shared top mirror 1502 is a triangular prism having triangular side facets and the array of LEDs 1504 includes RRGGB LEDs.

Figure 16:
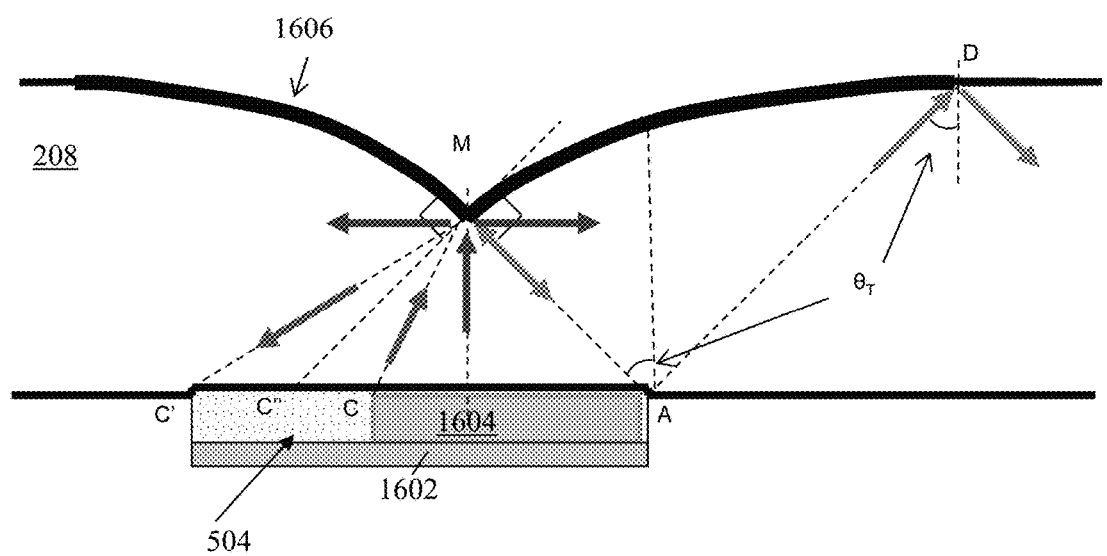
FIG. 16 is a cross-sectional view of an illumination panel featuring an asymmetrically placed LED.

The top curved mirror 1502 is not limited to symmetric structures; it may be designed asymmetrically if, for example, the LEDs 1504 are configured asymmetrically, such as an LED not located at the center of the LED sub-assembly 1506. In such a case, in order to avoid rays striking the LED sub-assembly (as illustrated in FIG. 5), the top curved mirror 1502 may be designed asymmetrically and/or located asymmetrically (relative to the center of the LEDs 1504). An example is shown in FIG. 16; there, the LED sub-assembly 1602 is asymmetric (relative to the center of the LED 1604) and, accordingly, the top curved mirror 1606 is asymmetrically located (relative to the center of the LED 1604). The curved mirror 1606 is located such that rays from point A are reflected back from point M toward point A and rays from point C are reflected from point M toward point C'. In this embodiment, a virtual point C" is located approximately at the center between point C and point C'; i.e., virtual rays from point C" striking point M will be back reflected to point C". In this embodiment, point M is located at the center between points A and C".

Figure 17:
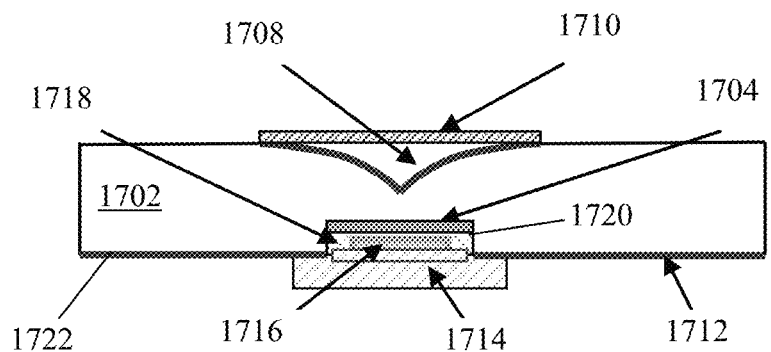
FIG. 17 is a cross-sectional view of an illumination panel featuring a phosphor layer.

FIG. 17 illustrates a side view of a waveguide 1702 that features a phosphor layer 1704. The phosphor layer 1704 may produce white light from a single-color LED light source 1706. The phosphor layer 1704 preferably converts some of the light from the LED 1706 to another wavelength. The original light adds to the converted light, creating white light. For example, a blue LED may be combined with a yellow phosphor layer, and the blue light from the LED may combine with the yellow light from the phosphor layer to produce white light. In some embodiments, phosphors are utilized to facilitate the emission of white light (or light of another preferred wavelength).

In accordance with embodiments of the invention, the configuration depicted in FIG. 17 includes a patterned waveguide 1702 and an LED chip 1716 with matching indices of refraction. The waveguide may be an optical polymer, e.g., a polymethyl methacrylate (PMMA), and may include a bottom notch 1720 (for embedding the LED 1716 therein) and a top curved mirror 1708. The waveguide 1702 may be formed by molding or by another suitable process known in the art. The waveguide 1702 may also include a bottom mirror 1712. The LED chip 1716 may be mounted into the waveguide notch 1720 such that it substantially seals the notch 1720 along the bottom surface 1722 of the waveguide 1702. Any remaining space in the notch 1720 may be filled with an index-matching material 1718 having an index of refraction matching that of the waveguide 1702. The phosphor layer 1704 may be formed above or around the LED chip 1716, or it may be deposited directly in the waveguide notch 1720 prior to introduction of the LED chip 1716. An absorber layer 1710 and a substrate 1714 may also be included.

Figure 18A:
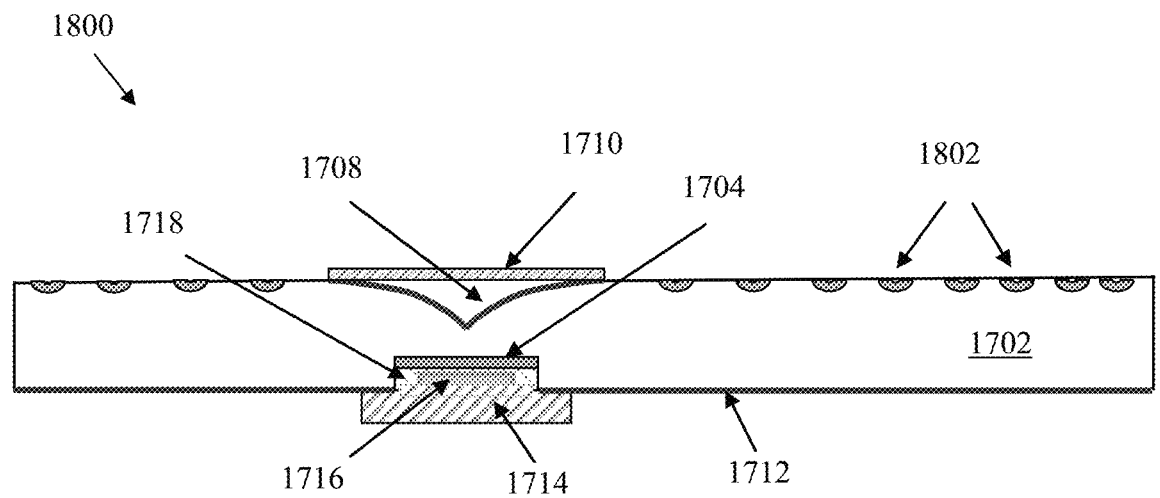
FIGS. 18A and 18B are a cross-sectional view and top view, respectively, of an illumination panel.
Figure 18B:
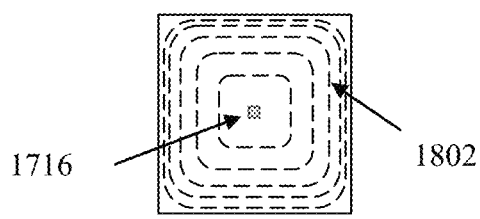

FIGS. 18A and 18B depict a side and top view, respectively, of an isolated panel configuration 1800, including a phosphor layer, that adds scattering structures 1802. The illumination system 1800 may be utilized in cases where the waveguide 1702 thickness is either approximately equal to (or even larger than) the width of the LED 1716, as well as in cases where the waveguide thickness is less than the LED width. The phosphor-containing system may also be utilized in tiled or isolated configurations, as described above.

Selective "coatings" on particular areas of a waveguide that form mirrors and/or reflectors may be time consuming, expensive, or difficult to manufacture. Also, forming a coated surface with approximately 100% reflectivity is quite difficult and often impossible. Thus, several embodiments of the present invention facilitate manufacturing by eliminating the need for selective-area coatings while maintaining high coupling efficiencies.

Figure 19:
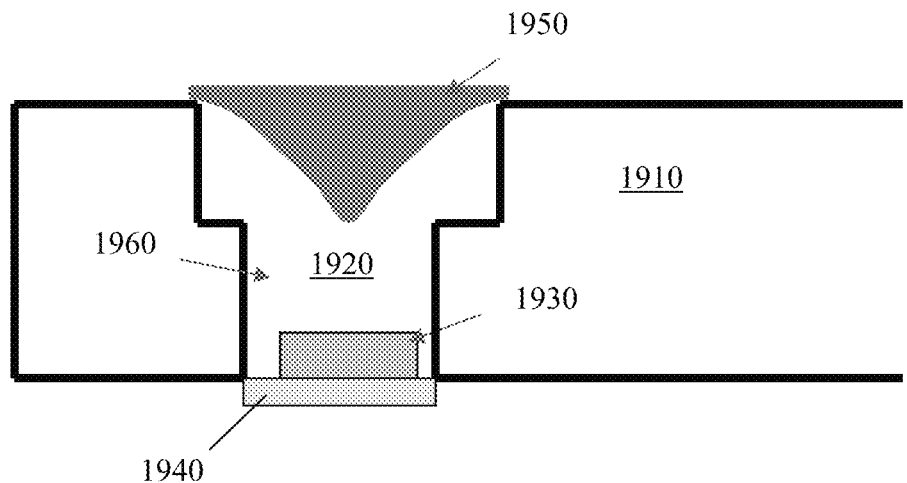
FIG. 19 is a cross-sectional view of an illumination system having a cavity and a curved mirror inserted therein.

FIG. 19 depicts a side view of a waveguide 1910 having, through at least a substantial portion of its thickness, a cavity 1920 formed therein. An LED 1930 (or other light source) may abut a bottom portion of cavity 1920 or be embedded therein, as shown in FIG. 19. LED 1930 may be supported by a sub-assembly 1940 (as described above). A conical mirror 1950 is positioned (e.g., inserted or deposited) within the top portion of cavity 1920 (i.e., opposing LED 1930). Conical mirror 1950 may be coated on its "front," i.e., curved, surface. The remaining volume of cavity 1920 is preferably filled with an index-matching material 1960 that has an index of refraction substantially the same as that of waveguide 1910. Conical mirror 1950 is preferably three-dimensional (rather than, e.g., a shaped two-dimensional sheet) and substantially conical, parabolic, pyramidal, and/or prismatic in shape. Conical mirror 1950 may include or consist essentially of a reflective metal, e.g., aluminum, and may even have a reflective coating on at least the surface positioned within the cavity. In an alternate embodiment, conical mirror 1950 includes or consists essentially of topaz or a polymer such as PMMA and is coated with a coating of a reflective metal, e.g., aluminum and/or silver. In embodiments in which conical mirror 1950 is coated, generally the surface of conical mirror 1950 facing the incident light is coated and thus reflects the light. Since the coating may be formed on conical mirror 1950 through the use of an adhesive material therebetween, this configuration prevents incident light from having to pass through or being unexpectedly reflected by the adhesive material. In some embodiments, a substantially flat mirror (as described below with reference to FIGS. 21A and 21B), rather than or in addition to conical mirror 1950, may be formed over or within cavity 1920.

Figure 20:
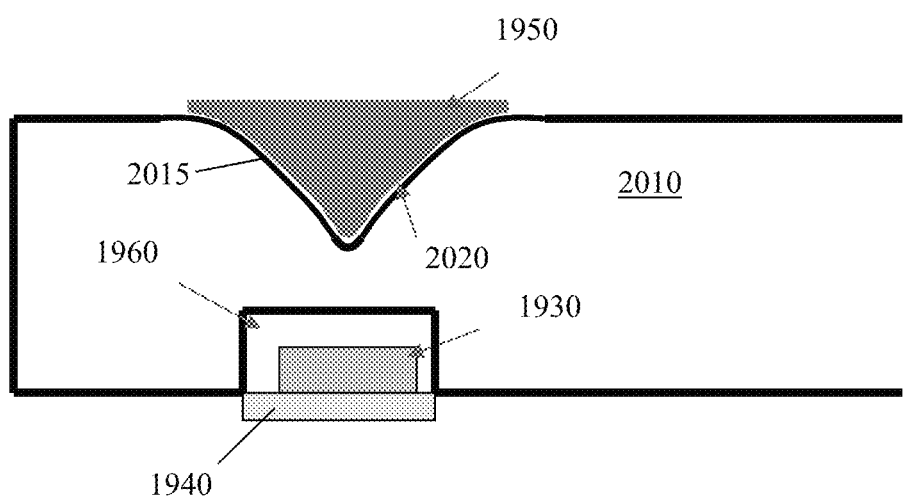
FIG. 20 is a cross-sectional view of an illumination system having a waveguide with a depression in a surface thereof and a curved mirror disposed over the depression.

Although the embodiment depicted in FIG. 19 may be easily manufactured, the optical coupling efficiency of the waveguide may be further improved by increasing even further the proportion of light rays emitted from an LED that undergo total internal reflection within the waveguide. Referring to FIG. 20, a waveguide 2010 has an LED 1930 embedded in a cavity (or notch) therewithin and a top depression 2015 similar in shape to conical mirror 1950. Depression 2015 is an angled interior feature that reflects impinging light, preferably into confined modes of waveguide 2010. In particular embodiments, depression 2015 is approximately conical, parabolic, pyramidal, or prismatic in shape. As in FIG. 19, an index-matching material 1960 may surround LED 1930 in the cavity. Conical mirror 1950 is positioned in depression 2015 of waveguide 2010, leaving a small air gap 2020. Air gap 2020 may have a thickness ranging from approximately 100 µm to approximately 200 µm, or even smaller (e.g., ranging from approximately 10 µm to approximately 50 µm, or may even be less than approximately 10 µm). Air gap 2020 effectively acts as a "cladding layer" for depression 2015 of waveguide 2010, increasing the amount of light from LED 1930 that undergoes total internal reflection into waveguide 2010. In certain embodiments, air gap 2020 is at least partially filled with a filler material that may have a lower refractive index than the refractive index of the waveguide material and/or adhesive properties for adhering conical mirror 1950 into depression 2015 of waveguide 2010. The difference in refractive indices between the filler material and the waveguide material may be less than approximately 0.2. For example, the waveguide material may be PMMA having a refractive index of approximately 1.5 and the filler material may be silicone having a refractive index of approximately 1.3. In various embodiments, a portion of the light emitted by LED 1930 strikes depression 2015 at an angle such that it "escapes" the waveguide (i.e., transmits through the surface of the waveguide at depression 2015). The escape angle may be defined by Snell's Law, and depends upon the indices of refraction of the waveguide and of air gap 2020 (or a cladding material therewithin). Any light that escapes depression 2015 of waveguide 2010 is substantially reflected, by conical mirror 1950, into waveguide 2010 where it may undergo total internal reflection. Thus the optical coupling efficiency of the waveguide is enhanced without the need for a cavity through the entire waveguide thickness.

The high optical coupling efficiencies of the embodiments depicted in FIGS. 19 and 20 are demonstrated by the following examples. Assuming that the sides of the waveguide are coated and exhibit 98% reflectivity, and that the conical mirror also exhibits 98% reflectivity, the embodiments depicted in FIGS. 19 and 20 exhibit approximately 94.5% and 92% optical coupling efficiency, respectively. If the conical mirror has a reflectivity of only 91%, then the embodiments exhibit respective optical coupling efficiencies of approximately 89% and 91%. Thus, for a less reflective conical mirror, the addition of an air gap results in greater light confinement in the waveguide.

In some embodiments, it is desirable to "route" light emitted from a light source (e.g., any of the above-described LEDs) through the waveguide in a particular direction to a specific output region. Thus, an edge of the waveguide opposite this output region will generally be reflective in order to guide light travelling in the "wrong" direction back toward the output region. In such embodiments, it may be desirable to have light reflected from a side edge of a waveguide (and already in a total-internal-reflection mode) simply pass through a depression in the waveguide surface rather than be reflected back in the "wrong" direction. However, some embodiments of the above-described conical mirrors may prevent such propagation. In such embodiments, the conical mirror may be replaced by a substantially flat mirror (i.e., one that is sheet-like with minimal thickness) that covers (or "seals") the opening to the depression in the waveguide. An additional advantage of this embodiment is that it obviates the need for conical mirrors shaped to fit a waveguide depression, or vice versa.

Figure 21A:
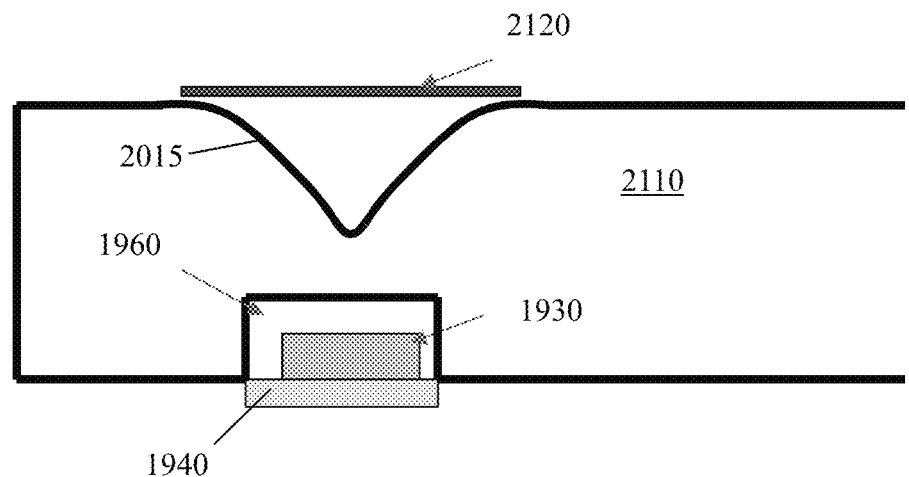
FIGS. 21A and 21B are cross-sectional views of an illumination system having a waveguide with a depression in a surface thereof and a substantially flat mirror disposed over the depression.
Figure 21B:
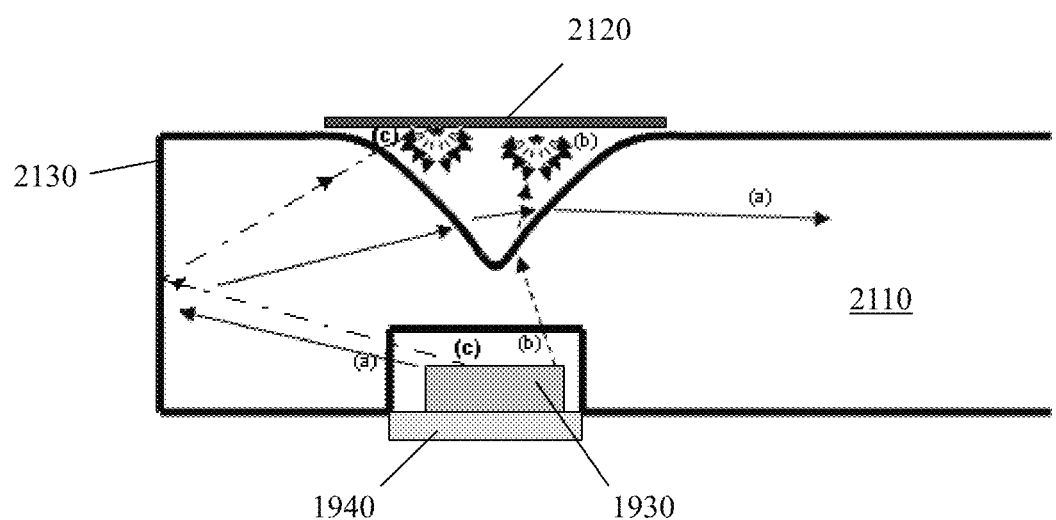

FIG. 21A depicts such a variant, in which waveguide 2110 has above depression 2015 a substantially flat mirror 2120; the region between depression 2015 and flat mirror 2120 is "empty," e.g., filled with only air. Flat mirror 2120 may be a specular mirror, a diffusive reflector, a Fresnel reflector, a diffractive optical element, or other means of reflecting light back into the waveguide. Flat mirror 2120 may be a substantially planar sheet of reflective material, e.g., a foil such as VIKUITI Enhanced Specular Reflector Film, available from 3M of St. Paul, Minn. An advantage of this embodiment is depicted in FIG. 21B, which illustrates three exemplary light rays emanating from LED 1930. The light ray labeled (a) is emitted from LED 1930 toward the side facet 2130 of waveguide 2110 and reflected back toward depression 2015 at a confined angle. Light ray (a) passes through the surfaces of depression 2015, with a slight change in propagation angle, and proceeds through the waveguide in a confined mode. Such light would not be as efficiently coupled in the waveguide had a conical mirror been in place in depression 2015.

In contrast, the light rays labeled (b) and (c) are, respectively, emitted directly toward depression 2015 or reflected back toward depression 2015 in an unconfined mode. These light rays strike flat mirror 2120 (depicted as a diffusive mirror in FIG. 21B) and are largely reflected back into the waveguide in confined modes (much as in the embodiments having a curved mirror described above). Effectively, the region of waveguide 2110 covered by flat mirror 2120 receives a portion of the light from one or more light sources disposed thereunder (e.g., LED 1930) and distributes it into the waveguide in confined modes. Flat mirror 2110 may have a reflectivity of greater than approximately 80%, greater than approximately 90%, or even greater than approximately 95%.

In an exemplary embodiment, flat mirror 2120 is a diffusive mirror having a Lambertian distribution and 98% reflectivity (and the waveguide edges also have 98% reflectivity, as in the above examples). In such a case, an optical coupling efficiency of approximately 88% is obtained, very close to the values obtained with the conical mirrors. Thus, nearly the same optical coupling efficiencies may be obtained in a much more manufacturable fashion. For example, during fabrication of a waveguide, the above-described depression(s) may simply be embossed or "punched" into the waveguide material during a single-step process. The depressions may then simply be covered with flat mirrors, obviating the need for conical mirrors, prisms, or the like.

The embodiments of FIGS. 19-21 may be utilized with other elements described above, e.g., phosphor layers, absorbers, scattering structures, and/or various panel configurations, and may be utilized with multiple light sources. The waveguides described herein may have thicknesses of approximately 1 mm, or even less.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. An illumination structure comprising:
   a waveguide having (i) an out-coupling region for emitting light from the waveguide, and (ii) a cavity extending through a thickness of the waveguide;
   one or more discrete light sources positioned to emit light into the cavity;
   a mirror positioned above and/or within the cavity above the one or more discrete light sources; and
   a phosphor layer positioned to convert a wavelength of light emitted by at least one of the one or more discrete light sources to a different wavelength.

2. The illumination structure of claim 1, wherein the mirror comprises a conical mirror disposed at least partially within the cavity.

3. The illumination structure of claim 1, wherein the mirror comprises a flat mirror.

4. The illumination structure of claim 1, wherein a cross-sectional area of a first portion of the cavity proximate the mirror is larger than a cross-sectional area of a second portion of the cavity proximate the one or more discrete light sources.

5. The illumination structure of claim 1, wherein the one or more discrete light sources comprises at least three discrete light sources.

6. The illumination structure of claim 1, wherein the one or more discrete light sources comprises at least four discrete light sources.

7. The illumination structure of claim 1, wherein (i) the one or more discrete light sources comprises a plurality of discrete light sources, and (ii) at least two of the discrete light sources emit light of substantially the same wavelength.

8. The illumination structure of claim 1, wherein (i) the one or more discrete light sources comprises a plurality of discrete light sources, and (ii) at least two of the discrete light sources emit light of different wavelengths.

9. The illumination structure of claim 1, wherein the mirror comprises at least one of a specular mirror, a diffusive reflector, a Fresnel reflector, or a diffractive optical element.

10. The illumination structure of claim 1, wherein a surface of the waveguide proximate at least one of the discrete light sources comprises a reflective coating thereon.

11. The illumination structure of claim 1, wherein (i) the out-coupling region comprises at least a portion of a top surface of the waveguide, and (ii) at least a portion of the bottom surface of the waveguide comprises a reflective coating thereon, the bottom surface of the waveguide opposing the top surface of the waveguide.

12. An illumination structure of claim 1 comprising:
   a waveguide having (i) an out-coupling region for emitting light from the waveguide, and (ii) a cavity extending through a thickness of the waveguide;
   one or more discrete light sources positioned to emit light into the cavity; and
   a mirror positioned above and/or within the cavity above the one or more discrete light sources,
   wherein at least a portion of the cavity not occupied by the one or more discrete light sources and the mirror is filled with an index-matching material.

13. The illumination structure of claim 12, wherein an index of refraction of the index-matching material is substantially equal to an index of refraction of the waveguide.

14. The illumination structure of claim 12, wherein the index-matching material is adhesive.

15. The illumination structure of claim 12, wherein an index of refraction of the index-matching material is less than an index of refraction of the waveguide.

16. The illumination structure of claim 12, wherein the index-matching material comprises silicone.

17. The illumination structure of claim 12, further comprising a phosphor layer positioned to convert a wavelength of light emitted by at least one of the one or more discrete light sources to a different wavelength.

18. An illumination structure comprising:
   a waveguide having (i) an out-coupling region for emitting light from the waveguide, and (ii) a cavity extending through a thickness of the waveguide;
   one or more discrete light sources positioned to emit light into the cavity; and
   a mirror positioned above and/or within the cavity above the one or more discrete light sources,
   wherein a thickness of the waveguide spanning the top and bottom surfaces is greater than a width of at least one of the discrete light sources.

19. The illumination structure of claim 18, wherein the thickness of the waveguide is at least as thick as a sum of the width of at least one of the discrete light sources and a thickness of at least one of the discrete light sources.

20. The illumination structure of claim 18, further comprising a phosphor layer positioned to convert a wavelength of light emitted by at least one of the one or more discrete light sources to a different wavelength.

* * * * *